(12) United States Patent
Okada et al.

(10) Patent No.: US 10,687,392 B2
(45) Date of Patent: Jun. 16, 2020

(54) WATERPROOFING STRUCTURE INCLUDING A LEAD WIRE AND A WIRE HEATER

(71) Applicant: NITTA CORPORATION, Osaka (JP)

(72) Inventors: Masatsugu Okada, Mie (JP); Kazuhiro Shimamura, Mie (JP)

(73) Assignee: NITTA CORPORATION, Osaka (JP)

( * ) Notice: Subject to any disclaimer, the term of this patent is extended or adjusted under 35 U.S.C. 154(b) by 493 days.

(21) Appl. No.: 14/898,617

(22) PCT Filed: Jun. 5, 2014

(86) PCT No.: PCT/JP2014/064913
§ 371 (c)(1),
(2) Date: Dec. 15, 2015

(87) PCT Pub. No.: WO2014/208304
PCT Pub. Date: Dec. 31, 2014

(65) Prior Publication Data
US 2016/0119978 A1 Apr. 28, 2016

(30) Foreign Application Priority Data

Jun. 24, 2013 (JP) .................................. 2013-131971

(51) Int. Cl.
*H05B 3/04* (2006.01)
*H01R 4/22* (2006.01)
(Continued)

(52) U.S. Cl.
CPC ................ *H05B 3/04* (2013.01); *F16L 53/38* (2018.01); *H01R 4/22* (2013.01); *H02G 3/22* (2013.01); *H01R 4/184* (2013.01); *H01R 13/5216* (2013.01)

(58) Field of Classification Search
CPC ........................... H05B 3/03; H05B 2203/016
(Continued)

(56) References Cited

U.S. PATENT DOCUMENTS 2,989,613 A * 6/1961 Morey ..................... H05B 3/56
219/528
3,694,626 A * 9/1972 Harnden, Jr. ............ H05B 3/48
219/521

(Continued)

FOREIGN PATENT DOCUMENTS

| JP | 52-149285 | 11/1977 |
| JP | 05-084033 | * 11/1993 |

(Continued)

OTHER PUBLICATIONS

Office Action issued in Japan Counterpart Patent Appl. No. 2013-131971, dated Apr. 25, 2017.
(Continued)

*Primary Examiner* — Ibrahime A Abraham
*Assistant Examiner* — Frederick F Calvetti
(74) *Attorney, Agent, or Firm* — Greenblum & Bernstein, P.L.C.

(57) ABSTRACT

A lead wire is electrically connected to an electric power source. A wire heater is supplied with electric power through the lead wire to generate heat. An insertion hole is formed in a housing. The lead wire and the wire heater are connected by a caulked member and fixed to each other, while aligning the tips of the lead wire and the wire heater in the same direction. The lead wire and the wire heater, connected by the caulked member, are fixed in the insertion hole with being inserted from the inlet portion of the insertion hole toward the end portion of the insertion hole. Sealing resin is injected into the insertion hole from an injection hole formed in the end portion, and filled therein.

4 Claims, 3 Drawing Sheets

(51) Int. Cl.
*F16L 53/38* (2018.01)
*H02G 3/22* (2006.01)
*H01R 13/52* (2006.01)
*H01R 4/18* (2006.01)

(58) Field of Classification Search
USPC .......................................................... 219/541
See application file for complete search history.

(56) References Cited

U.S. PATENT DOCUMENTS

| | | | | |
|---|---|---|---|---|
| 4,349,727 | A * | 9/1982 | Churchill | H05B 3/06 |
| | | | | 219/510 |
| 5,935,473 | A * | 8/1999 | Hashimoto | F01N 3/2026 |
| | | | | 219/541 |
| 5,945,019 | A * | 8/1999 | Tanaka | B22F 7/062 |
| | | | | 219/541 |
| 6,031,213 | A * | 2/2000 | Hashimoto | F01N 3/2026 |
| | | | | 219/541 |
| 6,078,028 | A * | 6/2000 | Cooper | F23Q 7/22 |
| | | | | 219/270 |
| 6,204,488 | B1 * | 3/2001 | Toya | F27D 99/0073 |
| | | | | 219/444.1 |
| 7,714,257 | B2 | 5/2010 | Pilavdzic | B29C 45/2737 |
| | | | | 219/541 |
| 7,891,270 | B2 * | 2/2011 | Higashi | B62K 21/26 |
| | | | | 16/421 |
| 2004/0211770 | A1 * | 10/2004 | Renwick | H05B 3/06 |
| | | | | 219/541 |
| 2009/0034949 | A1 * | 2/2009 | Sawada | F24H 1/102 |
| | | | | 392/488 |
| 2009/0065495 | A1 * | 3/2009 | Arbour-Neagoe | B21D 39/046 |
| | | | | 219/541 |
| 2010/0075522 | A1 | 3/2010 | Okayasu et al. | |
| 2011/0070781 | A1 * | 3/2011 | Kitagawa | H01R 4/185 |
| | | | | 439/877 |
| 2013/0309903 | A1 * | 11/2013 | Iio | H01R 13/5216 |
| | | | | 439/523 |
| 2015/0340848 | A1 * | 11/2015 | Nakashima | C08G 18/4825 |
| | | | | 174/72 A |
| 2019/0126865 | A1 * | 5/2019 | Takamatsu | B60R 16/033 |

FOREIGN PATENT DOCUMENTS

| | | |
|---|---|---|
| JP | 5-84033 | 11/1993 |
| JP | 05-326109 | * 12/1993 |
| JP | 5-326109 | 12/1993 |
| JP | 7-176359 | 7/1995 |
| JP | 11-233173 | 8/1999 |
| JP | 2001-126802 | * 5/2001 |
| JP | 2009-30771 | 2/2009 |
| JP | 2010-033781 | 2/2010 |
| JP | 2010-080202 | 4/2010 |

OTHER PUBLICATIONS

Office Action issued in China Counterpart Patent Appl. No. 201480034090.4, dated Aug. 1, 2017, along with an English translation thereof.

Office Action issued in Japan Counterpart Patent Appl. No. 2013-131971, dated Nov. 22, 2016.

International Search Report issued in PCT/JP2014/064913, dated Aug. 5, 2014.

Office Action issued in China Counterpart Patent Appl. No. 201480034090.4, dated Jan. 26, 2017 , along with an English translation thereof.

Search Report issued in European Patent Office (EPO) Patent Application No. 14818468.4, dated Jan. 13, 2017.

Office Action issued in China Counterpart Patent Appl. No. 201480034090.4, dated Jul. 30, 2018 , along with an English translation thereof.

* cited by examiner

WATERPROOFING STRUCTURE INCLUDING A LEAD WIRE AND A WIRE HEATER

TECHNICAL FIELD

The present invention relates to a device for heating an aqueous urea piping provided to an exhaust emission control device, for example, and more particularly relates to a waterproofing structure at a connecting portion between a wire heater for heating the piping and a lead wire for supplying an electric power to the wire heater.

BACKGROUND ART

Conventionally, for such a heating device, there is known a device disclosed in PATENT DOCUMENT 1 (Japanese Unexamined Patent Publication No. 2009-30771). In this heating device, a wiring passage is formed in a solderless terminal. A wire heater is inserted from an opening of the wiring passage, a lead wire is inserted from the opposite opening of the wiring passage, and the wire heater and the lead wire are connected in the wiring passage. Since waterproofing should be performed for the connecting portion, the inside portions of the two openings of the wiring passage are provided with sealing members.

PRIOR ART DOCUMENT

Patent Document

PATENT DOCUMENT 1: Japanese Unexamined Patent Publication No. 2009-30771

SUMMARY OF THE INVENTION

Problem to be Solved by the Invention

In an operation in which the wire heater and the lead wire are connected in the solderless terminal, a fixing operation is needed, in which the wire heater and the lead wire are inserted into the wiring passage from opposite directions and are fixed to a fixture. Namely, while maintaining the fixed state, the wire heater and the lead wire should be connected to each other, and this connecting operation is very cumbersome and requires skill. Further, if the outer diameter of the lead wire is changed, it is necessary to redesign not only the solderless terminal but also the sealing member for waterproofing, which causes an increase in the manufacturing cost.

An object of the present invention is to provide a waterproofing structure for a linear member, in which the connecting operation of the wire heater and the lead wire is easy, and even if the outer diameter of the lead wire is changed, the design and the manufacture are easy.

Means for Solving the Problems

According to the present invention, a waterproofing structure for a linear member comprises a lead wire electrically connected to an electric power source, a wire heater supplied with electric power through the lead wire to generate heat, a housing formed with an insertion hole, and a caulked member (i.e., connector) connecting the lead wire and the wire heater to fix the lead wire and the wire heater to each other, while aligning the tips of the lead wire and the wire heater in the same direction; the lead wire and the wire heater, which are connected by the caulked member, are fixed in the insertion hole following insertion from the inlet portion of the insertion hole toward the end portion of the insertion hole; and sealing resin, which is injected from an injection hole formed in the end portion, is filled in the insertion hole.

The caulked member is a plate member having a groove receiving the lead wire and the wire heater, for example, and both edges of the groove may be configured to be curved while the lead wire and the wire heater are placed in the groove so that the lead wire and the wire heater are connected and fixed to each other. In this case, it is preferable that the wire heater is placed on a bottom surface of the groove, the lead wire is mounted on the wire heater, and the edges of the caulked member are curved and pressed against an upper surface of the lead wire.

A projection may be formed on an inner wall of an intermediate hole connecting the insertion hole and the injection hole to partially engage with an outer surface of the caulked member to fix the caulked member. According to this construction, the lead wire and the wire heater can be temporarily fixed in the housing to increase the ease of a sealing-resin injection operation.

Effect of the Invention

According to the present invention, an effect is obtained, in which the connecting operation of the wire heater and the lead wire is made easy, and even if the outer diameter of the lead wire is changed, the design and the manufacture are made easy.

EMBODIMENT OF THE INVENTION

In the following, an embodiment of the present invention, which is a waterproofing structure, will be described with reference to the drawings.

Figure 1:
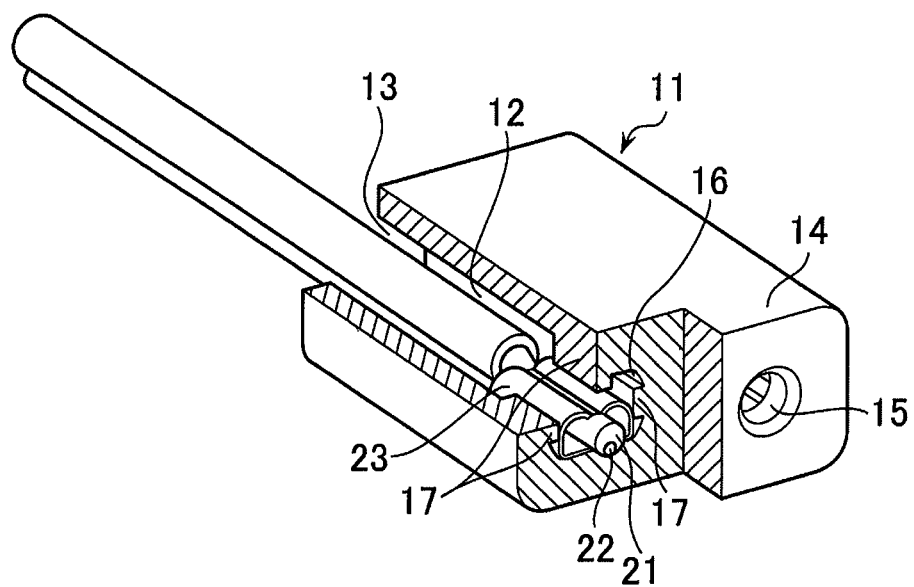
FIG. 1 is a partially breakaway perspective view, which shows a waterproof structure of an embodiment of the present invention.

As shown in FIG. 1, a housing 11 is formed with an insertion hole 12, into which a lead wire 21 and a wire heater 22 are inserted. The insertion hole 12 extends from an inlet portion 13 to an end portion 14, where an injection hole 15 is formed. An intermediate hole 16 connecting the insertion hole 12 and the injection hole 15 is formed in the housing 11.

The lead wire 21 is electrically connected to an electric power source (not shown). The wire heater 22 is electrically connected to the lead wire 21, such that the wire heater 22 is supplied with electric power through the lead wire 21 to generate heat. When the present embodiment is applied to an exhaust emission control device, the wire heater 22 is used for heating an aqueous urea piping, for example. However, the present invention is not limited to this application.

The lead wire 21 and the wire heater 22 are arranged such that the tips of the lead wire 21 and the wire heater are in the same direction; these tips are fixed by a caulked member 23. As described later, the caulked member 23 has a channel-shape section before the lead wire 21 and the wire heater 22 are attached to the caulked member 23. Conversely, after the lead wire 21 and the wire heater 22 are mounted on the caulked member 23, both edges of the caulked member 23 are plastic-deformed to curve inward, and are pressed against an upper surface of the lead wire so that the lead wire 21 and the wire heater 22 are connected and fixed to each other.

Four projections 17 are formed on an inner wall of the intermediate hole 16 of the housing 11. The projections 17 project inwardly from upper, lower, right, and left sides of the inner wall shown in FIG. 1. The lead wire 21 and the wire heater 22 are inserted from the inlet portion 13 of the insertion hole 12 toward the end portion 14 while being connected by the caulked member 23, which is engaged with the upper and lower projections 17, for example, of the four projections 17. Namely, the projections 17 partially engage with an outer surface of the caulked member 23, so that the caulked member 23 is fixed.

Figure 2:
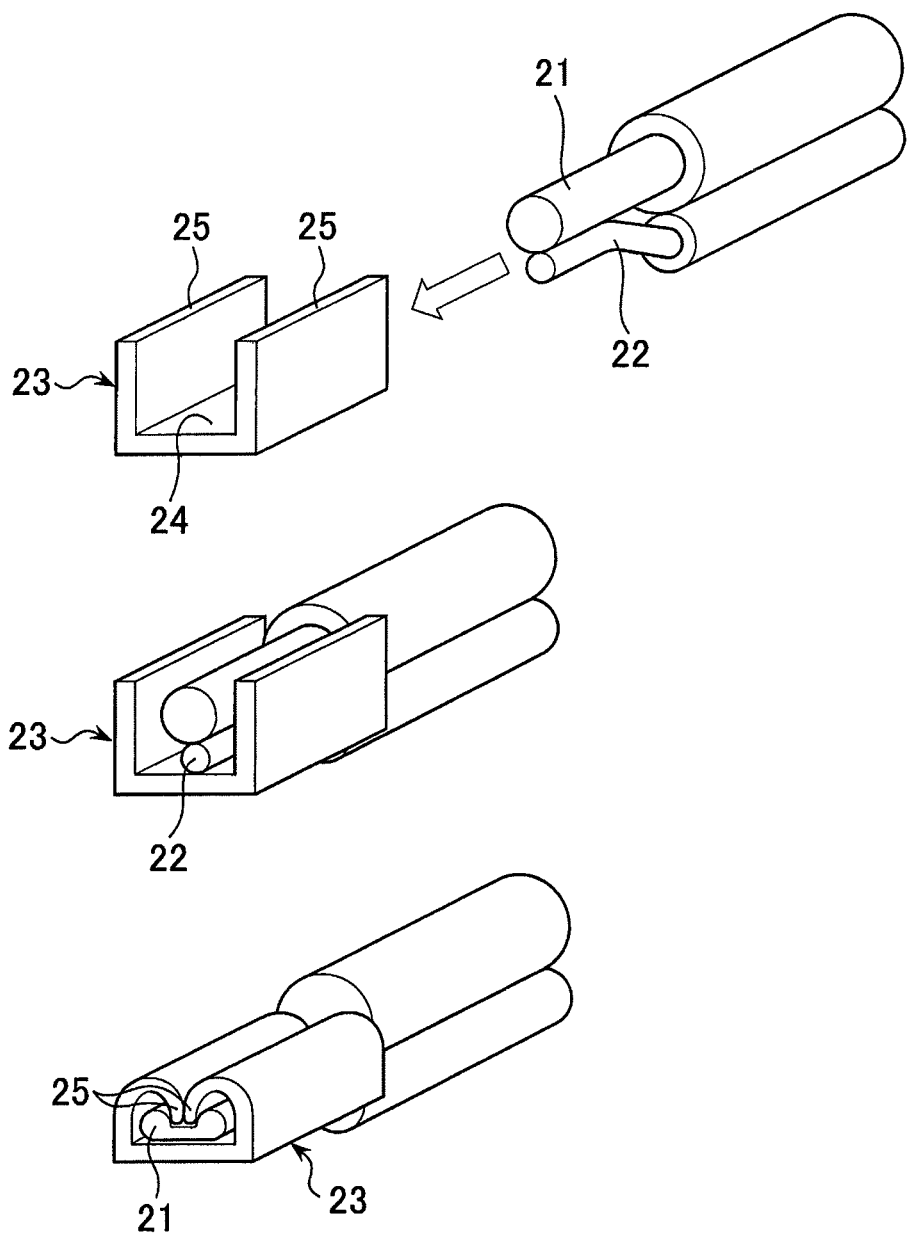
FIG. 2 is an explanatory view showing a process, in which a lead wire and a wire heater are connected and fixed to each other by a caulked member.
Figure 3:
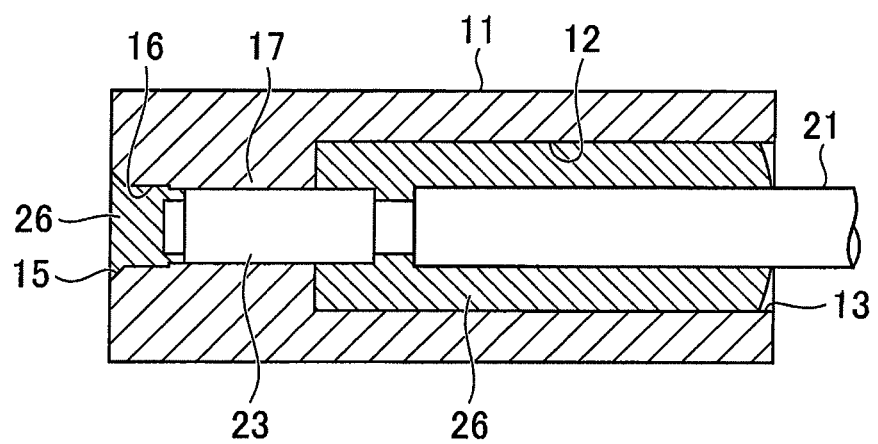
FIG. 3 is a cross-sectional view of the waterproofing structure shown in FIG. 1.

FIG. 2 shows a process, in which the lead wire 21 and the wire heater 22 are connected and fixed to each other by the caulked member 23. The caulked member 23 is a plate member having a groove 24 receiving the lead wire 21 and the wire heater 22. The wire heater 22 has a smaller diameter than the lead wire 21, and is placed under the lead wire 21. Namely, the wire heater 22 is placed on a bottom surface of the groove 24, and the lead wire 21 is mounted on the wire heater 22. Then, both edges 25 of the caulked member 23 are curved inward and pressed against an upper surface of the lead wire 21 so that the lead wire 21 is crushed and deformed into a flat shape. Conversely, although the wire heater 22 is buried in a lower portion of the lead wire 21 by the deformation of the lead wire 21, the wire heater 22 keeps its original shape.

The lead wire 21 and the wire heater 22 connected by the caulked member 23 are temporarily in the insertion hole 12 by the engagement of the caulked member 23 with the projections 17 of the intermediate hole 16. In this state, sealing resin 26 is injected from the injection hole 15 and filled into the insertion hole 12. The sealing resin 26 is silicon-modified polymer-based elastic adhesive, and is supplied into the insertion hole 12 through a space between the projections 17 of the intermediate hole 16 to reach the inlet portion 13.

As described above, the present embodiment is configured such that the wire heater 22 is placed under the lead wire 21 and the wire heater 22 and the lead wire 21 are connected by the caulked member 23, while the tips of the lead wire 21 and the wire heater 22 are in the same direction. The lead wire 21 and the wire heater 22 are temporarily fixed in the insertion hole 12 by engagement of the caulked member 23 with the projections 17 of the intermediate hole 16. Namely, the operator can temporarily fix the lead wire 21 and the wire heater 22 in the insertion hole 12 with one hand and inject the sealing resin 26 through the injection hole 15, while holding the housing 11 in the other hand. Therefore, according to the present embodiment, compared with a conventional case in which the lead wire and the wire heater are abutted in opposite directions and attached to the caulked member, a tool for temporarily holding the lead wire and the wire heater is not needed, and the operation becomes very simple, and does not require a skill or experience.

Further, in a prior art, it was necessary to provide sealing members that fit the lead wire and the wire heater and tightly seal the wire insertion hole in the both-end openings of the wire insertion hole provided in the housing. Conversely, in the present embodiment the sealing resin 26 is used, and therefore, the sealing members are not needed. Thus, even when the diameter of the lead wire is changed, it is not necessary to redesign the seal member. Further, a redesign of the caulked member is also unnecessary, and the caulked member 23, which can bundle and house the lead wire 21 and the wire heater 22, can be selected from commercial products. Therefore, according to the present embodiment, the manufacturing cost of the connecting assembly for the lead wire 21 and the wire heater 22 can be reduced.

Note that, while the wire heater 22 is provided in the above embodiment, the wire heater 22 can be replaced with a thin lead wire that generate heat due to an electric current, and the wire heater in the present invention contains such a thin lead wire.

While the sealing resin 26 is silicon-modified polymer-based elastic adhesive in the above embodiment, the sealing resin is not restricted to this particular material, and another adhesive having the similar sealing efficiency can be used.

Regarding the present invention, without departing from the intention and the scope of the present invention, defined by the claims attached hereto, various alterations, replacements, and substitutions can be made. Further, the present invention is not intended to be limited to a process, a device, a manufacture, a constituent, a means, or a step of a specific embodiment described in the specification. A person skilled in the art will recognize that a device, a means, or a method that substantially achieves a similar function as that caused by the embodiment described herein or substantially causes an equivalent operation and effect, can be led from the disclosure of the present invention. Accordingly, the attached claims are intended to be contained in such a device, a means, or a method.

The present application is an application claiming a right of priority on the basis of Japanese patent application (Patent Application No. 2013-131971, filed on Jun. 24, 2013), and the disclosure contained in the specification, the drawings, and the scope of claims of the basic application are expressly incorporated herein, by reference, in its entirety.

EXPLANATION OF REFERENCES 11 housing
12 insertion hole
13 inlet portion
14 end portion
15 injection hole
21 lead wire
22 wire heater
23 caulked member
24 groove
26 sealing resin

The invention claimed is:
1. A waterproofing structure, comprising:
a lead wire electrically connected to an electric power source;
a wire heater supplied with electric power through the lead wire to generate heat;
a housing formed with an insertion hole;
a connector that connects the lead wire and the wire heater to fix the lead wire and the wire heater to each other, while aligning tips of the lead wire and the wire heater in the same direction;
the lead wire and the wire heater, connected by the connector, being fixed in the insertion hole following insertion from an inlet portion of the insertion hole toward an end portion of the insertion hole, and sealing resin, injected from an injection hole formed in the end portion of the insertion hole, being filled into the insertion hole; and an intermediate hole having an inner wall that connects the insertion hole and the injection hole, four projections provided on the inner wail of the intermediate hole, one projection being provided on each of upper, lower, right and left side surfaces of the inner wall of the intermediate hole, and wherein each of the projections protrude inwardly and engage an outer periphery of the connector.

2. The waterproofing structure according to claim 1, wherein the connector has a main body with a groove provided therein, the groove receiving the lead wire and the wire heater, and wherein edges of the main body of the connector are curved inwardly while the lead wire and the wire heater are positioned in the groove so as to connect and fix the lead wire and the wire heater to each other.

3. The waterproofing structure according to claim 2, wherein the wire heater is positioned on a bottom surface of the groove, the lead wire is mounted on the wire heater, and the edges of the main body of the connector are curved and pressed against an upper surface of the lead wire.

4. The waterproofing structure according to claim 1, wherein at least one of the projections partially engage an outer surface of the connector to fix the connector within the intermediate hole.

\* \* \* \* \*